A. G. HILL.
Bee-Hives.
No. 155,443. Patented Sept. 29, 1874.
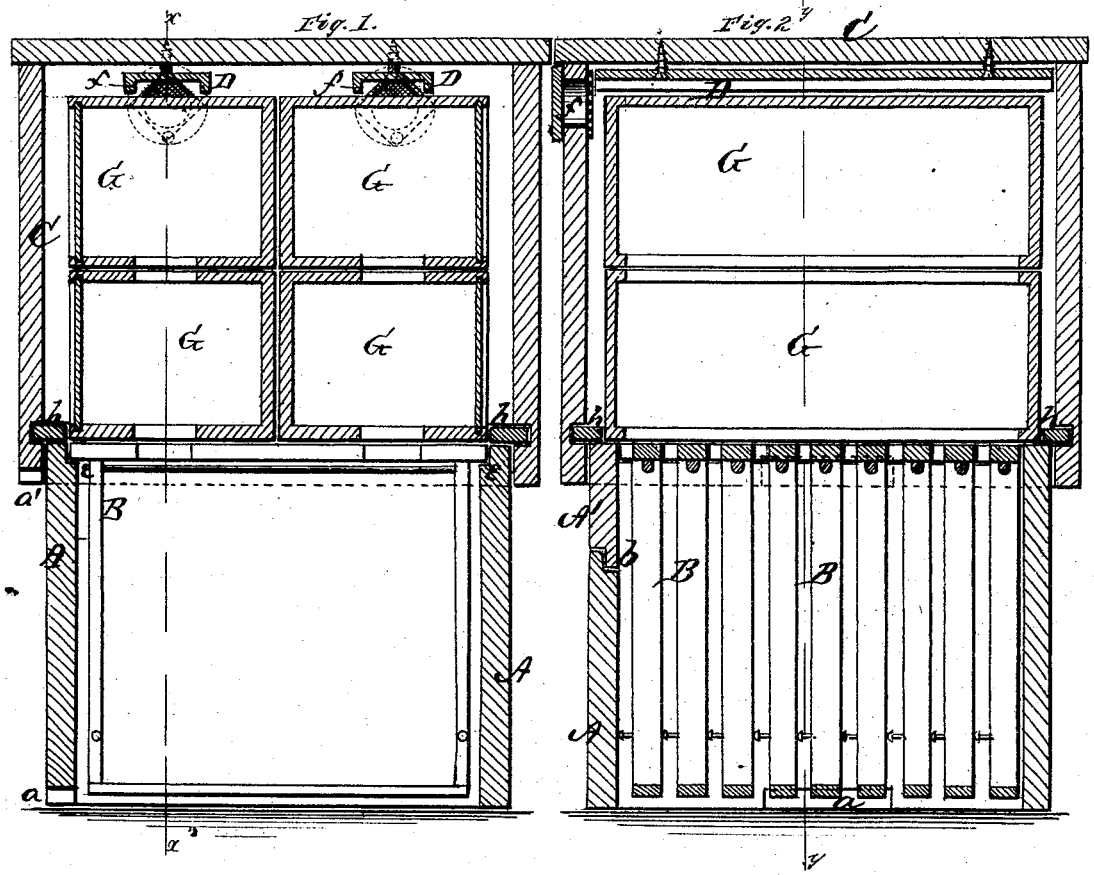
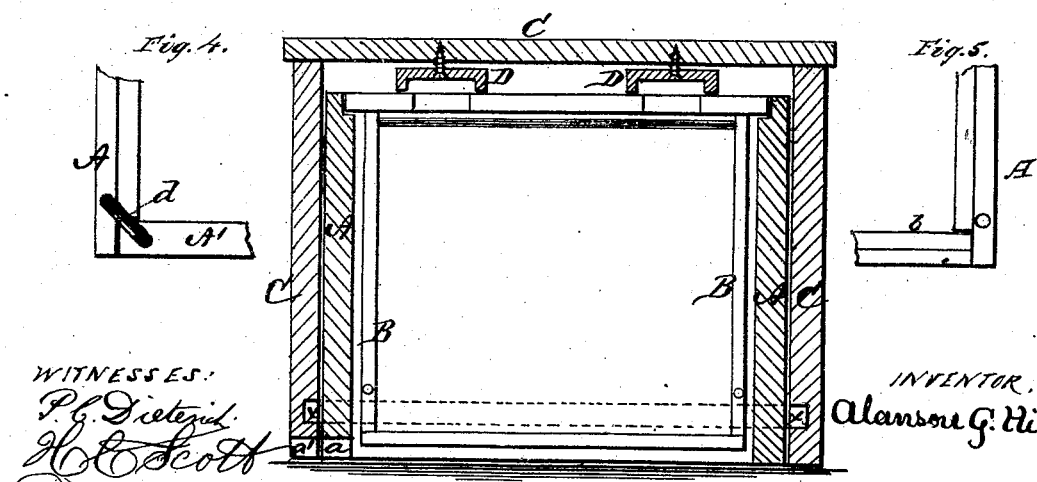
WITNESSES:
P. C. Dieterich
H. E. Scott
INVENTOR,
Alanson G. Hill
per C. H. Watson & Co.
ATTORNEYS.

UNITED STATES PATENT OFFICE.

ALANSON G. HILL, OF KENDALLVILLE, INDIANA.

IMPROVEMENT IN BEE-HIVES.

Specification forming part of Letters Patent No. 155,443, dated September 29, 1874; application filed August 10, 1874.

*To all whom it may concern:*

Be it known that I, ALANSON G. HILL, of Kendallville, in the county of Noble and State of Indiana, have invented certain new and useful Improvements in Bee-Hives; and I do hereby declare that the following is a full, clear, and exact description thereof, which will enable others skilled in the art to which it pertains to make and use the same, reference being had to the accompanying drawings, and to the letters of reference marked thereon, which form a part of this specification.

The nature of my invention consists in the construction and arrangement of a bee-hive, as will be hereinbefore more fully set forth.

In order to enable others skilled in the art to which my invention appertains to make and use the same, I will now proceed to describe its construction and operation, referring to the annexed drawings, in which—

Figure 1 is a vertical section of my hive through the line $y\ y$, Fig. 2. Fig. 2 is also a vertical section of the same through the line $x\ x$, Fig. 1. Fig. 3 is a section of the hive as used in winter-time. Figs. 4 and 5 are detached views of parts thereof.

A represents the body of the hive made in ordinary box form with entrance $a$ on one side at the lower edge. The upper part A' of one side of the box A is made movable, and connected with the stationary part thereof by a rabbet-joint, $b$, as shown in Fig. 2, and the said movable part A' held in place by means of square staples $d\ d$ across the corners, as shown in Fig. 4. B B are the comb-frames, constructed in any of the known and usual ways, and supported upon ledges $e\ e$ in opposite sides of the hive. C represents the upper part or cap of the hive, which is made of such size as to fit over and surround the entire box A, and it is provided with an opening, $a'$, to correspond with the bee-entrance $a$, when the cap thus incloses or surrounds the hive. This is intended to be the case in winter-time, so as to make a warm and comfortable hive for the bees. In the top of the cap C are attached two cleats, D D, which are grooved or channeled out longitudinally on their under sides. At one end of these cleats in the cap are ordinary ventilators $f\ f$. The grooves or channels in the cleats D D are directly over the openings in the top of the comb-frames B B, thus forming a complete ventilation for the hive. The cap C is on all sides near the lower edge on the interior provided with horizontal grooves $x$ for the insertion of strips or cleats $h\ h$, which project a suitable distance on the inside of the cap. These strips or cleats are to be used only in the summer-time, and when inserted in the grooves $x\ x$ they form ledges or stops by which the cap is supported upon the upper edges of the hive A. G G are honey-boxes constructed in the ordinary manner, and placed on the top of the comb-frames within the hive A.

By this construction of the hive and cap, it can be readily changed according to the season, and will at all times afford sufficient ventilation as well as warmth in winter-time.

Having thus fully described my invention, what I claim as new, and desire to secure by Letters Patent, is—

A hive consisting of two boxes, adapted for a winter and summer hive, arranged as shown, and ventilated by means of coincident apertures in the partitions, and the channels and ports, substantially as and for the purpose specified.

In testimony that I claim the foregoing as my own I affix my signature in presence of two witnesses.

ALANSON G. HILL.

Witnesses:
L. E. GOODWIN,
H. A. MOYER.